(12) United States Patent
Karapetkov et al.

(10) Patent No.: US 6,351,648 B1
(45) Date of Patent: Feb. 26, 2002

(54) METHOD FOR INDICATING THAT A TEXT MESSAGE IS PRESENT IN A MESSAGE CENTRAL MODULE OF A MOBILE RADIOTELEPHONE NETWORK

(75) Inventors: Stefan Karapetkov, Santa Clara, CA (US); Vincenzo Scotto Di Carlo, München; Wilhelm Müller, Wörth, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/269,527
(22) PCT Filed: Sep. 29, 1997
(86) PCT No.: PCT/DE97/02231
§ 371 Date: Mar. 29, 1999
§ 102(e) Date: Mar. 29, 1999
(87) PCT Pub. No.: WO98/15142
PCT Pub. Date: Apr. 9, 1998

(30) Foreign Application Priority Data

Sep. 30, 1996 (DE) .......................................... 196 40 219

(51) Int. Cl.[7] ................................................. H04Q 7/80
(52) U.S. Cl. ...................... 455/466; 455/414; 455/424; 455/412
(58) Field of Search .................. 455/433, 414, 455/466, 412, 424, 426, 38.4, 67.4, 67.7, 70, 566

(56) References Cited

U.S. PATENT DOCUMENTS

| | | | |
|---|---|---|---|
| 5,313,515 A | | 5/1994 | Allen et al. |
| 5,946,629 A | * | 8/1999 | Wayer et al. ............... 455/466 |
| 5,946,630 A | * | 8/1999 | Willars et al. ............. 455/466 |
| 5,987,323 A | * | 11/1999 | Houtari ...................... 455/433 |
| 5,787,357 A | * | 7/2000 | Salin .......................... 455/466 |
| 5,950,123 A | * | 9/2000 | Schwelb et al. ........... 455/414 |
| 6,119,014 A | * | 9/2000 | Alperovich et al. ........ 455/466 |
| 6,138,006 A | * | 10/2000 | Foti ............................ 455/414 |
| 6,141,550 A | * | 10/2000 | Ayabe et al. ............... 455/433 |
| 6,151,507 A | * | 11/2000 | Laiho et al. ............... 455/466 |
| 6,161,020 A | * | 12/2000 | Kim ........................... 455/466 |
| 6,163,704 A | * | 12/2000 | Joong et al. ............... 455/466 |

FOREIGN PATENT DOCUMENTS

WO    WO 96/26616    8/1996

OTHER PUBLICATIONS

XP 002019072—Implementation of Broadcast and Personal Message Services in an Experimental Mobile Radio System, Courau et al., pp. 144–151.
Roaming between cellular standards, Lantto, pp. 241–245.
Menu—pp. 22–27.

* cited by examiner

*Primary Examiner*—William Trost
*Assistant Examiner*—Congvan Tran
(74) *Attorney, Agent, or Firm*—Bell, Boyd & Lloyd LLC

(57) ABSTRACT

A method for indicating the presence of a text message in a mobile radiotelephone network if the recipient is registered as a subscriber both in the mobile radiotelephone network and in another communication network as a subscriber. It is provided that the availability of the subscriber in the other communication network is stored in the database, which is allocated to the subscriber, of the mobile radiotelephone network, and in wherein message central module communicates a message concerning the presence of a text message for the subscriber to a control module of the other communication network (PISN), and wherein this control module thereupon causes the displaying of an item of information concerning the presence of a text message in the message central module of the mobile radiotelephone network to a terminal apparatus allocated to the subscriber within the other communication network.

9 Claims, 3 Drawing Sheets

METHOD FOR INDICATING THAT A TEXT MESSAGE IS PRESENT IN A MESSAGE CENTRAL MODULE OF A MOBILE RADIOTELEPHONE NETWORK

The present invention relates to a method for indicating that a text message to be delivered to a subscriber is present in a message central module of a mobile radiotelephone network, wherein the module is provided for the acceptance and delivery of text messages, and the subscriber is registered as a subscriber both in the mobile radiotelephone network and in another communication network.

DESCRIPTION OF THE PRIOR ART

The above-described text messages are, for example, delivered to a GSM mobile radiotelephone terminal apparatus, within land-supported mobile radiotelephone networks according to the GSM Standard (Global System for Mobile Radiotelephony).

The text messages are also designated by the English term 'short message,' and the corresponding communication service is designated SMS, or short message service. The handling of a GSM mobile radiotelephone terminal apparatus in the acceptance, reading, processing or erasing of text messages is known from, among other sources, the operating instructions for the GSM mobile radiotelephone terminal apparatus S3 of Siemens AG, 1995, pages 24 to 27.

If, in known mobile radiotelephone networks, a short message is received in a message central module provided for the acceptance and delivery of text messages, wherein the message is to be delivered to a particular subscriber, the message central module effects a signaling to the mobile radiotelephone terminal apparatus of the subscriber. Such signaling causes this terminal apparatus to indicate the presence of a message. In the above-cited operating instructions, it is indicated that, given the presence of a message, an information symbol "i" blinks in the display of the mobile radiotelephone terminal apparatus in order to indicate the presence of a message.

The subscriber can then retrieve the present message as needed, whereupon the message central module causes a communication of the text information to the mobile radiotelephone terminal apparatus of the subscriber. This text information is stored in a memory on the SIM card of the subscriber, and can be displayed on the display of the terminal apparatus.

Both the information concerning the presence of a text message and the text message itself can be communicated from the message central module to the subscriber only if the mobile radiotelephone apparatus of the subscriber is located inside the radio area of the mobile radiotelephone network and is switched ready for operation, and if the energy supply to the terminal apparatus is ensured. This is because the terminal apparatus can be reached within the mobile radiotelephone network only under these conditions such being recognized as reachable within the mobile radiotelephone network in the context of what is called a roaming procedure. The current availability of a subscriber within a mobile radiotelephone network is hereby stored in a database allocated to the subscriber of the mobile radiotelephone network.

If a subscriber to whom a text message present in the message central module is to be delivered cannot be reached within the mobile radiotelephone network, the text message, or the indication of the presence of a text message, is standardly communicated to the mobile, radiotelephone terminal apparatus of the subscriber. This is done as soon as this mobile radiotelephone terminal apparatus can be reached again within the mobile radiotelephone network.

An object of the present invention, therefore, is to provide a method for indicating the presence of a text message to be delivered in a message central module of a mobile radiotelephone network, wherein a subscriber is also notified of the presence of a text message intended for him even if he is currently not able to be reached in the mobile radiotelephone network.

SUMMARY OF THE INVENTION

Advantageous developments of the invention are the subject matter of subclaims.

If, in a message central module of a mobile radiotelephone network intended for receipt and delivery of text messages, there is present a text message that is to be delivered to a subscriber who is registered as a subscriber both in the mobile radiotelephone network of the message central module and in a different communication network, then the message central module introduces steps for the delivery of a communication concerning the presence of this message. In a known manner, it is checked in the mobile radiotelephone network whether the subscriber can be reached within this mobile radiotelephone network. For this purpose, a database, which is allocated to the subscriber and in which the location of the subscriber is stored, of the mobile radiotelephone network is queried, if the subscriber currently can be reached within the mobile radiotelephone network.

According to the present invention, the availability of the subscriber in the other communication network is also stored in the database of the mobile radiotelephone network, and the message central module communicates a message concerning the presence of a text message for the subscriber to a control module of the other communication network. Dependent thereon, this control module causes the displaying of an item of information concerning the presence of a text message at a terminal apparatus allocated to the subscriber within the other communication network.

In this way, it is ensured that a subscriber always receives an indication concerning the presence of a text message if he can be reached in any communication network in which he is registered as a subscriber.

In order to limit the scope of the signaling information to be exchanged between the various communication networks, an embodiment of the inventive method provides that a message concerning the presence of a text message for the subscriber be communicated from the message central module of the mobile radiotelephone network to the control module of the other communication network only when the subscriber cannot be reached within the mobile radiotelephone network.

If, in a further embodiment of the present invention, only the availability in principle, and not the current availability, of the subscriber in the other communication network is stored in the database, allocated to the subscriber, of the mobile radiotelephone network, then a message concerning the presence of a text message for the subscriber is communicated to the control module of the other communication network, independent of whether he can actually be reached at the terminal apparatus of the other communication network. A disadvantage of this constructive form is that unnecessary messages are also transmitted between the communication networks. An advantage of this constructive form of the invention is that the subscriber receives an indication concerning the presence of a text message as soon as he can be reached in the other communication network, even if he could not be reached at the time of the transmission of the message concerning the presence of a text message to the control module.

The quantity of messages to be transmitted between the message central module of the mobile radiotelephone network and the control module of the other communication network can be reduced in that, in a further constructive form of the inventive method, the message central module communicates a message only when the availability of the subscriber in the other communication network has been recognized by the message central module.

An advantageous embodiment of the inventive method with respect to the reduction of an unnecessary exchange of messages between the mobile radiotelephone network and the other communication network provides that the current availability of the subscriber in the other communication network is stored in the database, allocated to the subscriber, of the mobile radiotelephone network. This can, for example, take place in that the other communication network communicates the current availability of the subscriber in the other communication network to the mobile radiotelephone network in the form of a message. Alternatively, the message central module of the mobile radiotelephone network can cause a check of the current availability of the subscriber in the other communication network, given the presence of a text message to be delivered to the subscriber.

The actual delivery of a text message to the subscriber typically takes place upon the request of the subscriber. The message central module thereby can deliver the text message, for example within the mobile radiotelephone network, to the mobile radiotelephone terminal apparatus of the subscriber whose availability was previously determined. However, it is also possible for the message central module of the mobile radiotelephone network to deliver the text message upon request of the subscriber to a data terminal apparatus of the subscriber via a different communication network. e.g., a data network.

The sending of short messages to the message central module of a mobile radiotelephone network is known from, among other sources, the article "Kurznachrichten mit dem PC versenden," Funkschau 17/1996, pages 50 to 52. Here, various systems are indicated for the transmission to a message central module of a mobile radiotelephone network, e.g. via a modem and the public telephone network or via the Internet, of short messages to be delivered to some subscriber. The delivery of messages to a subscriber is possible in analogous fashion from the message central module via a suitable communication network to a computer.

A further embodiment of the inventive method provides that, after the delivery of a text message, the message central module of the mobile radiotelephone network communicates a confirmation message to the control module of the other communication network, if a message concerning the presence of a text message for the subscriber was previously communicated to this control module. In this way, it is prevented that the presence of already-requested messages is displayed.

For the case in which the subscriber to whom a short message is to be delivered is available both in the mobile radiotelephone network and also in the other communication network with the aid of a terminal apparatus that can be switched between wireless operation and mobile radiotelephone operation, a development of the inventive method provides that the terminal apparatus operating in wireless operation switches over automatically to mobile radiotelephone mode after the receipt of an item of information concerning the presence of a text message.

An embodiment of such an inventive method provides that the terminal apparatus is switched over to mobile radiotelephone mode only if it is not in transceive operation and that, if the terminal apparatus is in transceive operation upon receipt of an item of information concerning the presence of a text message in wireless operating mode, the apparatus is switched over to mobile radiotelephone mode after termination of this transceive operation.

The displaying of an item of information concerning the presence of a text message can take place at the terminal apparatus allocated to the other communication network; e.g., visually by means of a display symbol of a display unit, by the display of a corresponding text, by the illumination of a lamp, and/or by a corresponding spoken announcement. The control module of the other communication network therein causes the communication of an item of control information, typically in the form of a message, to the terminal apparatus. The type of message is hereby dependent on the type of communication network and is known in principle.

The other communication network can, for example, be another mobile radiotelephone network, a stationary telephone network with, either a fixedly wired terminal apparatus or a wireless terminal apparatus, or a data network with a data terminal apparatus.

Additional features and advantages of the present invention are described in, and will be apparent from, the Detailed Description of the Preferred Embodiments and the Description of the Drawings.

DETAILED DESCRIPTION OF THE PREFERRED EMBODIMENTS

Figure 1:
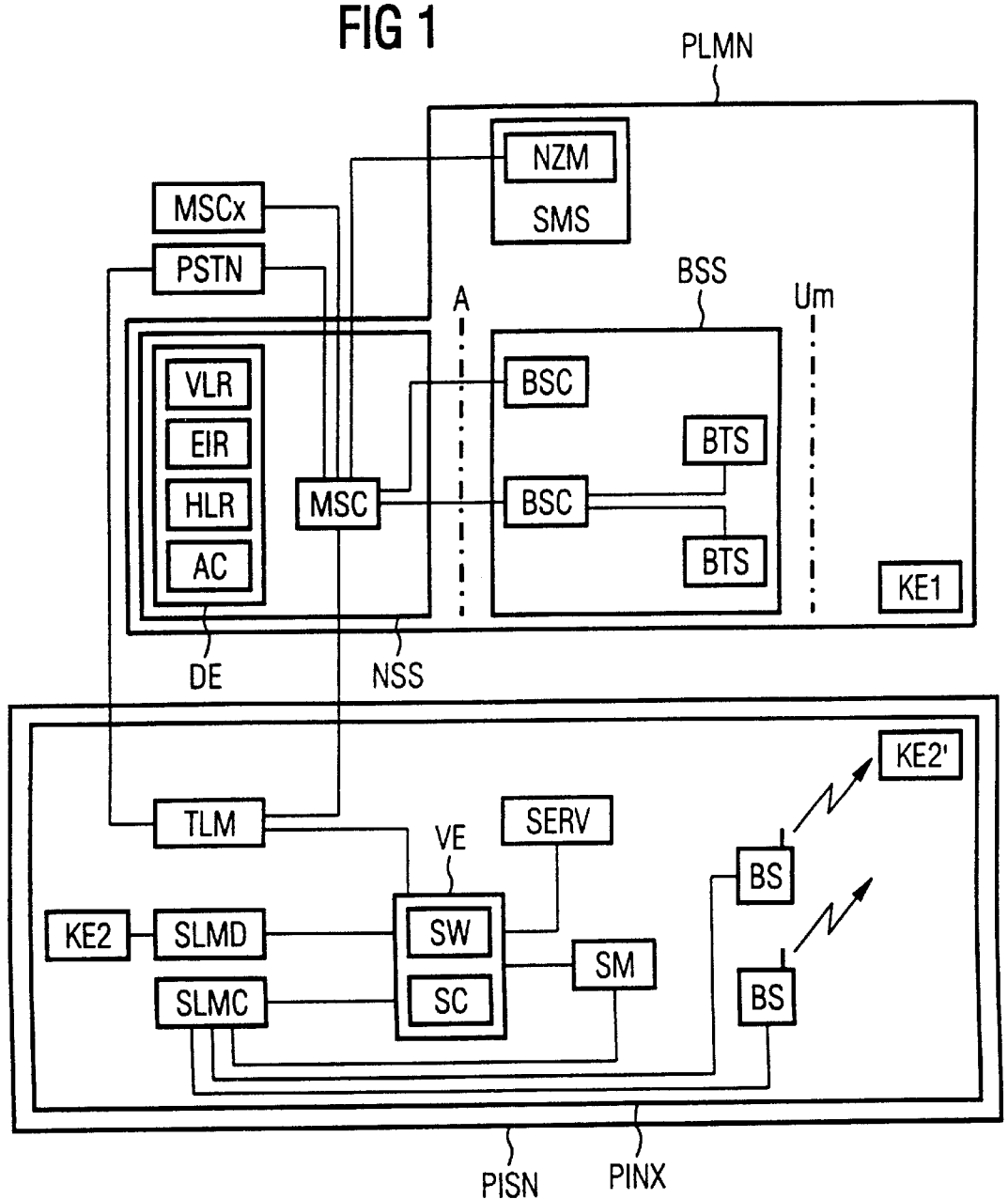
FIG. 1 shows, in a schematic view, a block switching diagram of a network arrangement consisting of a mobile radiotelephone network, a public stationary network, and a private network with a control module according to the teachings of the present invention.

FIG. 1 shows, in a schematic view, a block switching diagram of a mobile radiotelephone network PLMN with a short message service unit SMS (Short Message Service), with a network subsystem NSS (Network Subsystem) for setting up the connections between at least one mobile subscriber with other subscribers and for mobility management, and with a base station subsystem for controlling the radio connections with mobile stations. FIG. 1 shows, as an example, a mobile station as a communication terminal apparatus KE1.

The short message service unit SMS contains a message central module NZM for the receipt and delivery of text messages to subscribers of the mobile radiotelephone network. The main unit of the network subsystem NSS is a mobile service switching center MSC (Mobile Services Switching Center) which communicates with base station control units BSC (Base Station Controller) via an A-interface. In the one base station subsystem BSS shown in FIG. 1, a base station control unit BSC is provided that connects several base stations BTS with the mobile service switching center MSC as needed.

The mobile services switching center MSC serves as a standard switching node and, in addition provides all functionalities requires for the handling of mobile subscribers, such as registration, authentication, updating of location, call handover between base stations and call controlling to a subscriber registered as present in a region of a base station. The mobile services switching center MSC also provides connections to the public networks PSTN and, in the example according to FIG. 1, to another mobile services switching center MSCX, as well as to a private network PISN. A home location register HLR and a visitor location register VLR serve, together with the mobile services switching center MSC, for call controlling and determination of the location of subscriber terminal apparatuses in the mobile radiotelephone network.

Two further registers of the network subsystem NSS, namely an equipment identity register EIR and an authentication register AC, are used for authentication and for security purposes. The equipment identity register EIR contains a list of all mobile apparatuses allowed in the network, whereby each mobile station is identified by its international mobile equipment identification IMEI (International Mobile Equipment Identity). In the authentication center AC, copies of all secret keys respectively stored in the SIM card of each subscriber are stored and subsequentyly used for authentication and for encryption via the radio channel.

Accordingly, each subscriber has access, within the mobile radiotelephone network PLM, to a database allocated to him. In such database his authorizations, his location and further items of information are stored in retrievable fashion.

The mobile services switching center MSC communicates with the registers HLR, VLR, AC and EIR, using a protocol designated MAP (Mobile Application Part Protocol). This standardized protocol MAP contains signaling functions that are required for the provision of services required in a mobile network.

In addition, FIG. 1 shows a private network PISN with a switching device VE for the setting up and tearing down of connections between subscribers. The switching device VE contains a switching node SW and a switching control unit SC. The switching device VE can be connected, via a network line terminal module PIM, with a public communication network PSTN and with the mobile services switching center MSC of the mobile radiotelephone network PLNN. The switching device VE can set up connections to communication terminal apparatuses KE2, KE2' via subscriber terminal modules SLMD and SLMC. The subscriber terminal module for the digital terminal apparatus SLMD, shown as an example in FIG. 1, can be connected with a communication terminal apparatus KE2 via a line. The wireless subscriber terminal module SLMC, shown in FIG. 1, can be connected with a communication terminal apparatus KE2' via a base station ES and a radio path. In addition, a connection can be set up from the switching device VE via the wireless subscriber terminal module SLMC to a control module SM for short messages. For this purpose, a service number must be allocated to the control module SM at which a connection setup can be established; e.g., by the short message service unit SMS of the mobile radiotelephone network PLMN via the mobile services switching center MSC and the network line terminal module TLM. The control module SM is coupled, e.g. via an application interface (not shown in detail) or a computer-telephone interface (CTI), with the switching means in order to communicate information to a terminal apparatus KE2, KE2' via the switching device VE.

Figure 2:
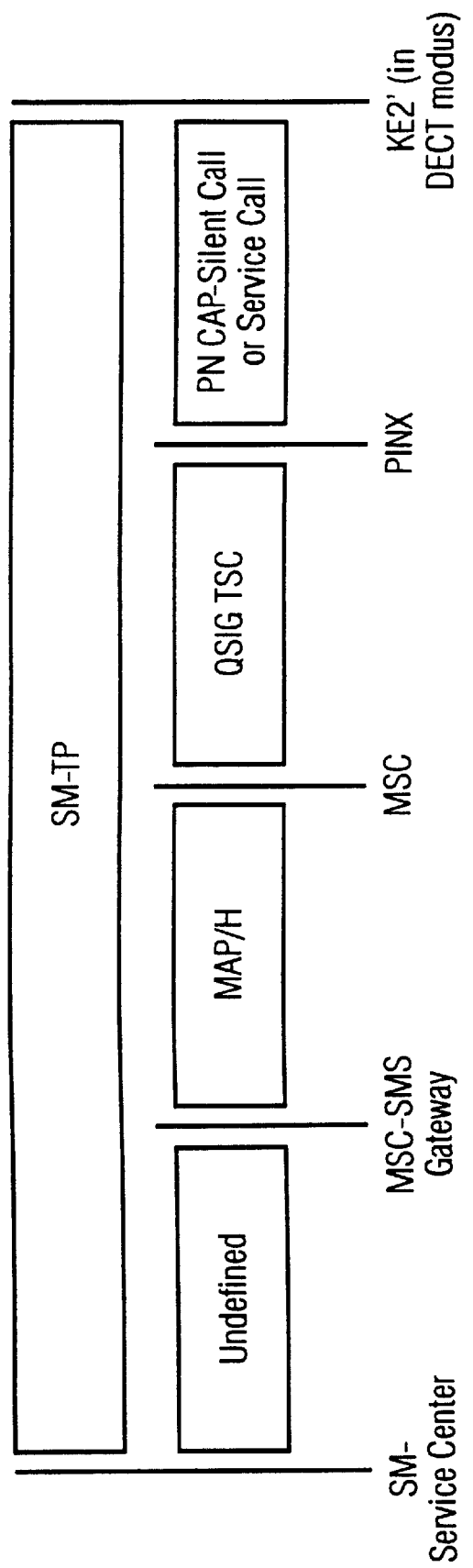
FIG. 2 shows a short message protocol in the application layer, as well as the protocols of the layer located therunder, with indication of the transition regions for the transmission of an item of information between a short message service center of a mobile radiotelephone network and a terminal apparatus of a private communication network.

Referring also to FIG. 2, if in the message central module NZM of the short message service unit SMS of the mobile radiotelephone network PLMN there is present a short message intended for a subscriber for whom the mobile station KE1 is registered in the mobile radiotelephone network PLMN, and moreover the subscriber terminal is registered in the private network PISN with the terminal apparatus KE2, it is checked within the mobile radiotelephone network PLMN where the subscriber can be reached, by querying the data unit DE, with the inclusion of the home location register HLR and the visitor location register VLR. For this purpose, an item of information concerning the presence of a text message is handed over to a gateway by the short message service unit in a non-standardized protocol. Such is arranged between the short message service unit and the mobile services switching center MSC in order to convert the named message into the format of a MAP/H-protocol. A MAP protocol contains signaling functions that are required for the provision of services required in a mobile radiotelephone network, and is standardized under the name "Mobile Application Part Protocol." The message present in the format MAP-H leads to a check in the mobile radiotelephone network PLMN of where the subscriber can be reached. If the subscriber cannot be reached in the mobile radiotelephone network PLMN, but the availability of the subscriber in the private network PISN is stored in the database, which is allocated-to the subscriber, then a message concerning the presence of a short message is sent from the mobile services switching center MSC to a private branch exchange PINX of the private network PISN, in the format of a protocol standardized according to QSIG (as show in) FIG. 2 in the format QSIG TSC). QSIG is a global signaling system for company networks based on DSS1. Detailed information concerning QSIG can be found in what is called the QSIG Handbook, which is available on the Internet at the address HTTP://www.QSIG.IE/QSIG-Handbook/.

FIG. 1 shows a private network PISN in the form of a single private branch exchange PINX. Of course, however, a private network PISN standardly consists of a multiplicity of private branch exchanges PINX connected with one another.

Within the private branch exchange PINX, the message concerning the presence of a short message is communicated to the terminal apparatus KE2 allocated to the subscriber with the use of protocols that are specific for the private branch exchange-called PN CAP in the example according to FIG. 2. In the embodiment according to FIG. 1, this takes place via the control module SM, which causes the switching device VE to control a display unit at the terminal apparatus KE2 in order to signal the presence of a text message in the mobile radiotelephone network PLNN.

Figure 3:
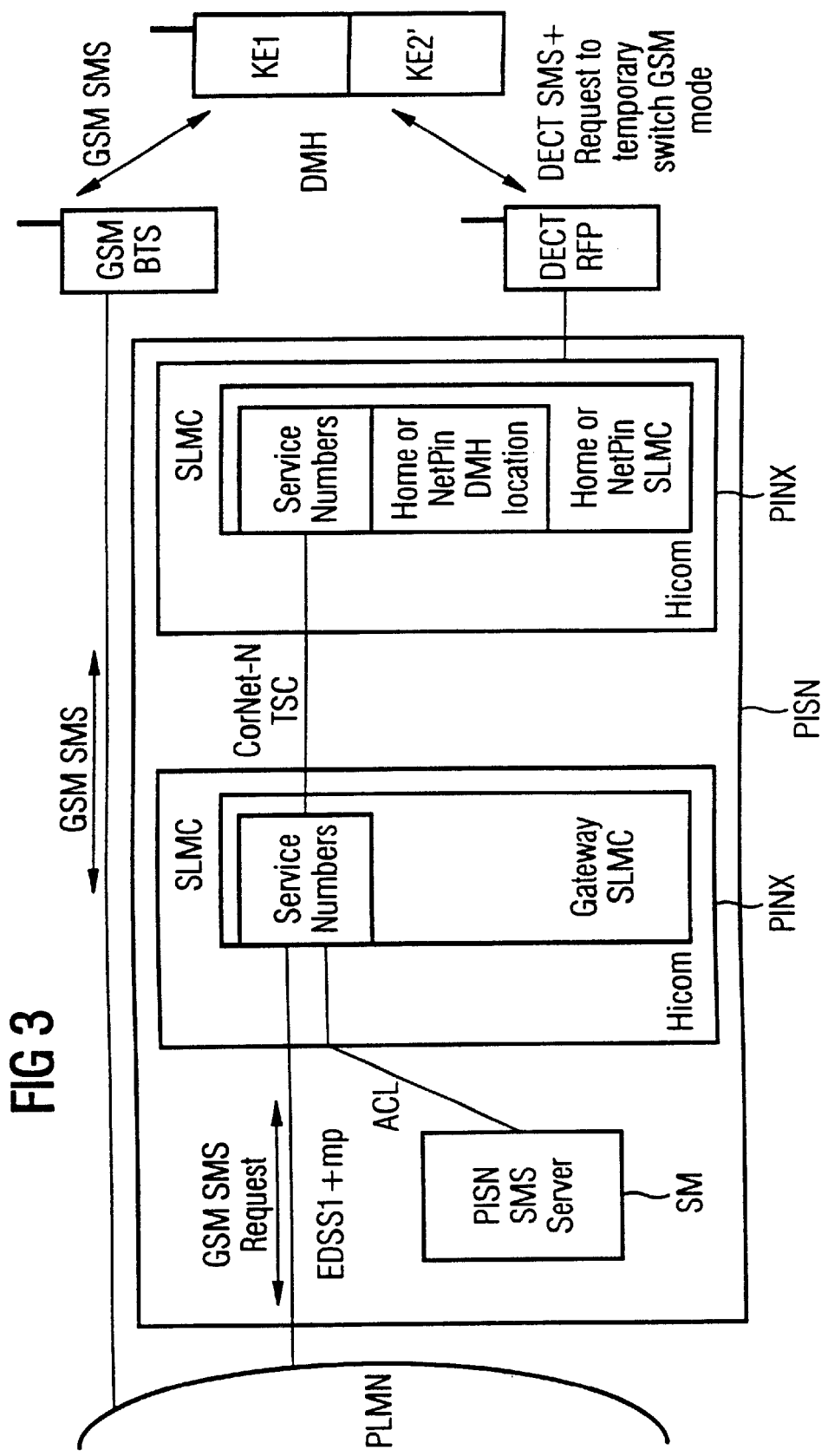
FIG. 3 shows the block switching diagram of a communication network arrangement specifically for the execution of a method of the present invention.

FIG. 3 shows the block switching diagram of a communication network arrangement consisting of a mobile radiotelephone network PLMN and a private network PISN, whereby a terminal apparatus KE1, allocated to a subscriber, of the mobile radiotelephone network PLMN, and a terminal apparatus KE2, allocated to the same subscriber, of the private network PISN are formed by a single dual mode hand apparatus DMH. Such dual mode hand apparatus DMH can be connected with a base station BS of the private network PISN via a wireless air interface and also can be connected with a base station BTS of the mobile radiotelephone network PLAN via a mobile radiotelephone air interface.

In the embodiment illustrated in FIG. 3, the mobile radiotelephone network PLMN sends, using a service number, a message concerning the presence of a short message for the subscriber of the terminal apparatus KE2, using a QSIG protocol, to a subscriber terminal module SLMC provided as a gateway, using a service number. This subscriber terminal module SLMC can be connected, via an application interface ACL, with a control module SM of a short message server for the private network. The control module SM causes the conversion of the information concerning the presence of a short message into an item of control information for the private network PISN. The information concerning the presence of a short message is transmitted to the subscriber terminal module SLMC with the use of a private branch exchange-internal protocol CorNet in the area of which module the dual mode hand apparatus DMH, and thus the terminal apparatus KE2, is registered as present. The subscriber terminal module SLMC causes the routing of the item of control information for the terminal apparatus via the base station BS in whose region the terminal apparatus KE2 is registered as present. In the specified example, in addition to the item of information concerning the presence of a text message, a request for temporary changeover of the dual mode hand apparatus into mobile radiotelephone mode is communicated.

If the dual mode hand apparatus DMH is switched over into mobile radiotelephone mode, i.e. if the terminal apparatus KE1 is activated, then, dependent on the receive state of the dual mode hand apparatus DMH, the text message can be registered in mobile radiotelephone mode.

Although the present invention has been described with reference to specific embodiments, those of skill in the art will recognize that changes may be made thereto without departing from the spirit and scope of the invention as set forth in the hereafter appended claims.

What is claimed is:

1. A method for delivering a text message that has been received in a message central module of a public mobile radio telephone network to a subscriber registered as a subscriber both in the mobile radio telephone network and in a second communication network which is of a different network type than the mobile radio telephone network, a location of the subscriber being stored in a database allocated to the subscriber, wherein the text message is delivered to the subscriber if the subscriber can be reached within the mobile radiotelephone network, the method comprising the steps of:

determining the presence of the text message to be delivered to the subscriber;

checking in the mobile radiotelephone network whether the subscriber can be reached within the mobile radiotelephone network;

storing the availability of the subscriber in the second communication network in the database allocated to the subscriber;

communicating a message, via the message central module, concerning the presence of the text message for the subscriber to a control module of the second communication network; and causing the displaying of an item of information, via the control module, concerning the presence of the text message in the message central module of the mobile radiotelephone network at a terminal apparatus allocated to the subscriber within the second communication network.

2. A method for delivering a text message as claimed in claim 1, further comprising the step of:

communicating a message concerning the presence of the text message for the subscriber to the control module of the second communication network via the message central module if the subscriber cannot be reached within the mobile radiotelephone network.

3. A method for delivering a text message as claimed in claim 1, further comprising the steps of:

checking the availability of the subscriber in the second communication network; and communicating a message, via the message central module, concerning the presence of the text message for the subscriber to the control module of the second communication network if the availability of the subscriber in the second communication network is recognized by the message central module.

4. A method for delivering a text message as claimed in claim 1, wherein only the availability in principle of the subscriber in the second communication network is stored in the database allocated to the subscriber.

5. A method for delivering a text message as claimed in claim 1, wherein a current availability of the subscriber in the second communication network is stored in the database allocated to the subscriber.

6. A method for delivering a text message as claimed in claim 5, further comprising the step of:

communicating to the mobile radiotelephone network, via the second communication network, a separate message concerning the current availability of the subscriber in the second communication network.

7. A method for delivering a text message as claimed in claim 1, further comprising the step of:

causing a check of a current availability of the subscriber in the second communication network, via the message central module of the mobile radiotelephone network, given the presence of the text message to be delivered to the subscriber.

8. A method for delivering a text message as claimed in claim 1, further comprising the steps of:

enabling the subscriber to be reached both in the mobile radiotelephone network and in the second communication network with the aid of a terminal apparatus that can be switched between wireless operation and mobile radiotelephone operation; and automatically switching the terminal apparatus into mobile radiotelephone mode after receipt of an item of information concerning the presence of the text message in the message central module of the mobile radiotelephone network.

9. A method for delivering a text message as claimed in claim 1, further comprising the step of:

communicating a confirmation message to the control module of the second communication network after the delivery of a text message, via the message central module of the mobile radiotelephone network, if a message concerning the presence of the text message for the subscriber previously has been communicated to the control module.

* * * * *